United States Patent [19]
Brezoczky

[11] Patent Number: 5,658,191
[45] Date of Patent: Aug. 19, 1997

[54] BURNISH HEAD FOR MAGNETIC MEDIA

[75] Inventor: Blasius Brezoczky, San Jose, Calif.

[73] Assignee: Phase Metrics, Inc., San Diego, Calif.

[21] Appl. No.: 574,934

[22] Filed: Dec. 19, 1995

[51] Int. Cl.$^6$ .................. B24B 39/06; B24B 7/04
[52] U.S. Cl. .................. 451/324; 451/312; 451/319; 451/552
[58] Field of Search .................. 451/312, 319, 451/324, 552, 555, 557, 558; 29/90.01

[56] References Cited

U.S. PATENT DOCUMENTS

| | | | |
|---|---|---|---|
| 4,330,910 | 5/1982 | Schachl et al. | 29/90.01 |
| 4,731,957 | 3/1988 | Weisinger | 451/555 |
| 4,845,816 | 7/1989 | Nanis | 29/90.01 |
| 5,063,712 | 11/1991 | Hamilton et al. | 451/324 |
| 5,241,793 | 9/1993 | Armato | 451/558 |

OTHER PUBLICATIONS

"Tribology and Mechanics of Magnetic Storage Devices," by Bharat Bhushan Spring–Verlag, 1990.

*Primary Examiner*—Eileen P. Morgan
*Attorney, Agent, or Firm*—Blakely Sokoloff Taylor & Zafman

[57] ABSTRACT

A burnish head comprising a slider body having a single crystal diamond attached to a rear portion flies above the disk surface at a relatively low flying height when the disk is rotated at a high angular velocity. The diamond produces acoustic waves that cut or crack disk asperities, resulting in a highly-smooth disk surface suitable for near-contact or in-contact magnetic recording.

4 Claims, 1 Drawing Sheet

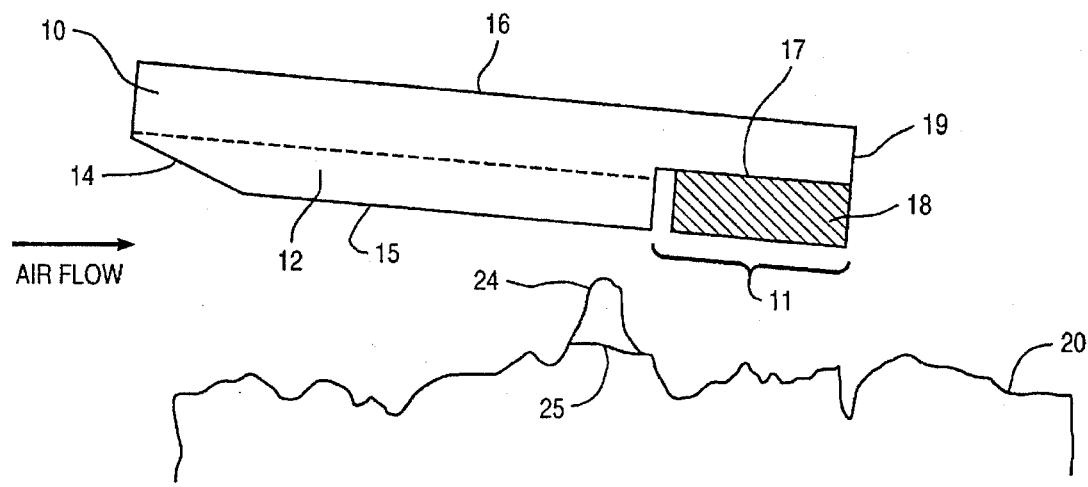
FIG_1
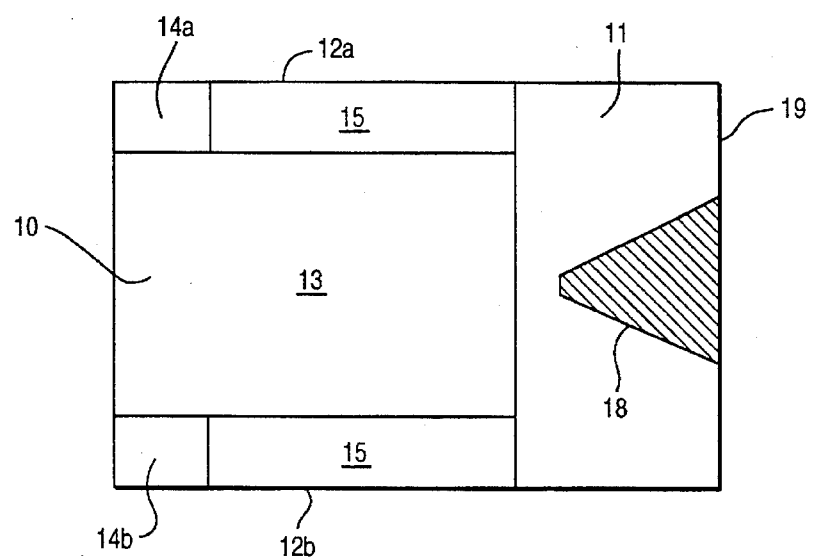
FIG_2A
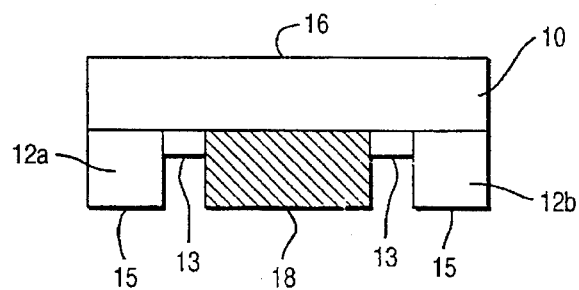
FIG_2B

BURNISH HEAD FOR MAGNETIC MEDIA

FIELD OF THE INVENTION

The present invention relates to the field of magnetic recording and tribology. More specifically, the invention relates to methods and apparatus for smoothing the surface of a magnetic disk. The present invention is also related to the design of hydrodynamic sliders which form the head element of a magnetic recording system.

BACKGROUND OF THE INVENTION

Rigid-disk files consist of a stack of one or more circular disks having a thin magnetic coating which are rotated at a high angular velocity. Data is recorded on the disk surfaces using heads or transducers mounted on long arms that are moved across the disk surfaces by a high-speed actuator. Information is actually recorded on circumferential tracks located on the disk surface. Reading the recorded information back involves sensing the magnetic transitions emanating from the surface of the disk by means of the read/write elements.

In recent years there has emerged a discernible trend in the magnetic recording industry toward thin-filmed head designs. Thin-film heads provide high-precision, multiple-track recording capabilities with high-bit and high-track densities. Thin film head designs also reduce the number of customized fabrication steps required to manufacture the individual heads by capitalizing on semiconductor-like processing technology. As the requirements for magnetic head designs continue to stress narrower track widths, reduced flying heights above the disk surface, high disk rotational speeds, narrower gaps for improved resolution, and wider frequency response, thin film heads will continue to be attractive. Future advances in the magnetic recording industry will no doubt require miniaturization of the thin film head dimensions.

In a standard magnetic head recording system, the thin film head element is typically mounted along the rear edge of a block of non-magnetic material, commonly known as the slider. Sliders are designed such that the hydrodynamic pressure generated by a spinning disk causes the slider body to fly at a predetermined distance above the surface of the disk. During starting and stopping, the sliders rest in contact with the disk surface. In most cases, a plurality of skid pads are employed to provide an air-bearing surface during flying and provide contact points for the slider body during starting and stopping of the disk.

In high-performance disk drive units, it is generally desirable to maintain the head at a relatively low flying height so that a high signal-to-noise ratio amplitude can be achieved. Presently, magnetic transducers fly at nominal heights of approximately 5–8 microinches for a 4–6 gram head load.

One of the problems associated with high-performance recording heads is that as the flying height of the disk is reduced, asperities on the surface of the magnetic media may interact with the head. For example, when the head flies very near to the surface of the magnetic media, there is an increased chance that it may actually crash into large asperities projecting up from the surface of the disk. To avoid head crashes it is therefore highly desirable that the disk have an extremely smooth, asperity-free surface which is durable for both starting and stopping. Unfortunately, existing disk manufacturing processes make it virtually impossible difficult to achieve an asperity-free surface.

To overcome the problems inherent in the prior art, the present invention provides a specialized burnish head for conditioning the surface of the magnetic media. As will be seen, the novel head may be utilized for final smoothing operations of the disk surface. As the burnish head flies over the surface of the magnetic media, asperities are cut or cracked off, resulting in a highly-polished, smooth media surface.

SUMMARY OF THE INVENTION

The present invention covers a burnish head that removes asperities on the surface of a magnetic media. In one embodiment, the invention comprises a slider body having a single crystal diamond attached to a rear portion. When the slider is positioned over the disk surface and a positive air flow is developed by rotating the disk at a high velocity, the diamond glides above the disk surface at a relatively low flying height. As the diamond glides over the disk surface, it interacts with asperities, producing acoustic waves that cut or crack the asperities. The asperities are then blown or spun off the surface of the disk due to the high speed rotational velocity. The result is a highly smooth disk surface suitable for near-contact or in-contact magnetic recording.

BRIEF DESCRIPTION OF THE DRAWINGS

The present invention will be understood more fully from the detailed description which follows and from the accompanying drawings, which, however, should not be taken to limit the invention to the specific embodiments shown, but rather are provided for explanation and understanding only.

FIG. 1 is a side view of the burning head of one embodiment of the present invention. It conceptually illustrates the interaction between the burnish head of the present invention and an asperity located on the surface of the magnetic media. FIGS. 2A & 2B are bottom and rear views, respectively, of the burnish head shown in FIG. 1.

DETAILED DESCRIPTION

A burnish head is described for smoothing the surface of a magnetic media by removing asperities. In the following description, numerous specific details are set forth such as particular shapes, materials, dimensions, etc., in order to provide a thorough understanding of the present invention. However, it will be obvious to one skilled in the art that the invention may be practiced without these specific details. In other instances, well-known processing techniques, materials, circuits, etc., have not been shown in detail in order to avoid unnecessarily obscuring the present invention.

FIG. 1 illustrates a side view of the burnish head of one embodiment of the present invention. The burnish head is shown flying above the rough surface of the magnetic media 20. Magnetic media 20 includes an asperity 24 that is cut or dislocated along crack 25 due to the acoustic waves produced by the burnish head.

The burnish head shown in FIG. 1 comprises a rectilinear slider body 10 having a pair of elongated, substantially parallel rails 12 disposed along the sides of body 10. Each or the rails 12 has a tapered portion 14 extending back from the leading edge (i.e., facing in the direction of the air flow). Air-bearing surfaces 15 face the disk during normal operation and provide a hydrodynamically lifting surface for the head as the disk rotates. On the opposite side of slider 10 is a planar, top surface 16 which extends the full length from the leading edge to the rear or trailing edge 19.

FIGS. 2A & 2B more clearly show the pair of rails 12a and 12b disposed substantially parallel along the sides of slider 10. Rails 12 extend downward toward the surface of the magnetic media 20 from a flat, bottom surface 13. Each of the rails 12a and 12b is also shown including a leading edge taper portion 12a and 14b, respectively.

Slider 10 also includes a cutout or removed portion 11. Cutout portion 11 extends a predetermined distance from trailing edge 19 of slider 10 toward the leading edge of the slider body. In the embodiments of FIGS. 1,2A and 2B, cutout portion 11 is shown having a rectilinear shape bounded by the rear edges of air-bearing surfaces 15a and 15b, bottom surface 13, trailing edge 19 and the sides of slider 10. A flat, attachment surface 17 is provided within cutout potion 11. Surface 17 is substantially parallel to surfaces 16, 13, and air-bearing surfaces 15.

Attached to surface 17 of cutout portion 11 is a hard, sharp edged member 18. In the embodiment illustrated in FIGS. 1, 2A and 2B, member 18 comprises a single crystal diamond having a crystal orientation {1,1,0}. The diamond is triangular in shape, and is attached to surface 17 such that the narrow portion of the triangle is directed into the airflow. In this configuration, the rear side of diamond 18 is coincident with trailing edge 19 of slider 10. The diamond which comprises member 18 may be attached to surface 17 utilizing a variety of well-known attachment or bonding methods. For example, an epoxy-based adhesive such as Master-Bond™ UV 15 is suitable.

It is appreciated by practitioners in the art that the surface of magnetic media 20 typically comprises a diamond-like carbon (DLC) overcoat which is extremely hard and durable. To be effective, member 18 of the burnish head should therefore be comprised of a substance having a hardness which is the same as or harder than that of the DLC overcoat. An industrial grade diamond is a low-cost substance that satisfies this criteria. Obviously, other substances or materials may be used to implement member 18. The choice depends upon the characteristic physical properties of the particular overcoat covering disk 20.

Another aspect of the present invention involves the flying attitude of the burnish head. Because asperities are dislocated by acoustic waves as a result of the interaction of the disk surface with member 18 (e.g., diamond), it is desirable to fly the slider at an attitude wherein member 18 is relatively low to the disk. This is one of the purposes of cutout portion 11. That is, to achieve the desired flying attitude, a portion of the rear of slider 10 (i.e., cutout portion 11) is removed so that there is less lifting force generated. This causes the diamond to fly lower—and therefore closer to the magnetic media—relative to the leading edge or tapered portions 14 of the slider. Practitioners within the art will further understand that a specific flying height can be achieved by tailoring the dimensions of the air-bearing surfaces, cutout portion, tapered portions, etc., in order to meet manufacturing or performance requirements.

During burnishing, the leading edges of the triangular-shaped diamond shown in the Figures propagates cracking of the asperities as the disk is rotated at a high angular velocity. This is illustrated by way of example in FIG. 1 wherein crack 25 is produced in asperity 24. Note that the rate propagation is dependent upon the sound velocity propagated by member 18 and the surface velocity of the disk. Cracking of the asperities also depends upon the density and the moduli of elasticity of the DLC overcoat covering the magnetic media. In this respect, it should be understood that the particular shape of the diamond 18 is not essential to the performance of the burnish head. In other words, a variety of shapes or edge angles may be employed in the burnish head of the present invention. The important mechanism is the interaction of the diamond with the surface.

Utilizing the burnish head shown in the Figures, a 3.5 inch DLC-coated disk spinning at 7,200 RPMs with an outside diameter (O.D.)-inside diameter(I.D.)-O.D. movement (10 seconds) has been demonstrated to make the disk essentially asperity-free. Moreover, the burnish head of the present invention can be used over and over again without significant wear (i.e., without losing its "cutting edge").

I claim:

1. A head for burnishing a rotatable magnetic media comprising:

a slider body having leading and trailing edges, top and bottom surfaces, and sides, a pair of spaced-apart elongated, substantially parallel air-bearing members being attached to the sides and extending downward from the bottom surface, the air-bearing members each having an air-bearing surface, the slider body also having a removed section extending a distance from the trailing edge toward the leading edge; and a single-crystal diamond fixedly attached to the slider body at the removed section, the single-crystal diamond having a bottom surface that is substantially coplanar with the air-bearing surfaces and an edge that causes cracking of asperities located on the magnetic media as the media rotates at a high velocity relative to the head.

2. The burnish head of claim 1 wherein the single-crystal diamond has a crystal orientation of {1,1,0}.

3. The burnish head of claim 1 wherein the single-crystal diamond is substantially triangular-shaped with a rear edge of the single-crystal diamond being substantially coincident with the trailing edge of the slider body.

4. The burnish head of claims 1, 2, or 3 wherein each of the air-bearing members includes a taper extending back from the leading edge of the slider body.

* * * * *

UNITED STATES PATENT AND TRADEMARK OFFICE
CERTIFICATE OF CORRECTION

PATENT NO.   :   5,658,191

DATED           :   August 19, 1997

INVENTOR(S) :   Brezoczky

It is certified that error appears in the above-identified patent and that said Letters Patent is hereby corrected as shown below:

In column 2 at line 34, please start a new paragraph beginning with the word " FIGS. "

In column 3 at line 4, please delete " 12a " and insert -- 14a --.

Signed and Sealed this

Nineteenth Day of January, 1999

Attest:

*Acting Commissioner of Patents and Trademarks*

*Attesting Officer*